United States Patent [19]

Blahut et al.

[11] 4,250,545
[45] Feb. 10, 1981

[54] DATA PROCESSING APPARATUS PROVIDING AUTOLOADING OF MEMORY POINTER REGISTERS

[75] Inventors: Donald E. Blahut, Holmdel; David H. Copp, Morristown; Daniel C. Stanzione, Marlboro, all of N.J.

[73] Assignee: Bell Telephone Laboratories, Incorporated, Murray Hill, N.J.

[21] Appl. No.: 974,363

[22] Filed: Dec. 29, 1978

[51] Int. Cl.³ .............................................. G06F 9/34
[52] U.S. Cl. ..................................................... 364/200
[58] Field of Search ... 364/200 MS File, 900 MS File, 200, 900

[56] References Cited

U.S. PATENT DOCUMENTS

| | | | |
|---|---|---|---|
| 3,292,151 | 12/1966 | Barnes et al. | 364/200 |
| 3,331,056 | 7/1967 | Lethin et al. | 364/200 |
| 3,764,988 | 10/1973 | Onishi | 364/200 |
| 4,037,211 | 7/1977 | Ikuta | 364/200 |
| 4,095,278 | 6/1978 | Kihara | 364/900 |

OTHER PUBLICATIONS

*MCS 6500 Microcomputer Family Hardware Manual*, MOS Technology, Inc., 950 Rittenhouse Road, Norristown, Pa., Jan. 1976, pp. 29-31.
*MCS 6500 Microcomputer Family Programming Manual*, MOS Technology, Inc., 950 Rittenhouse Road, Norristown, Pa., Jan. 1976, pp. 23-30.

*Primary Examiner*—Raulfe B. Zache
*Attorney, Agent, or Firm*—Arthur J. Torsiglieri

[57] ABSTRACT

A Central Processing Unit (CPU) provides programmable autoloading of memory pointer registers. The CPU includes an op-code extension register (OER) to store a code specifying the autoloading status of each memory pointer register. Whether or not a particular memory pointer register is loaded at the end of an instruction cycle with an operand address carried by the current instruction depends on the binary state of a particular bit position in the OER corresponding to the particular memory pointer register. The contents of the OER can be changed by means of an instruction for transferring a new code to OER. A CPU architecture having an OER permits software specification of autoloading without significantly increasing the number of op-codes required to define the instruction set. Fewer op-codes generally permit shorter instructions. The advantages provided by shorter instructions are reduced memory overhead for program storage and increased processing efficiency in data processing systems having a small word size.

3 Claims, 13 Drawing Figures

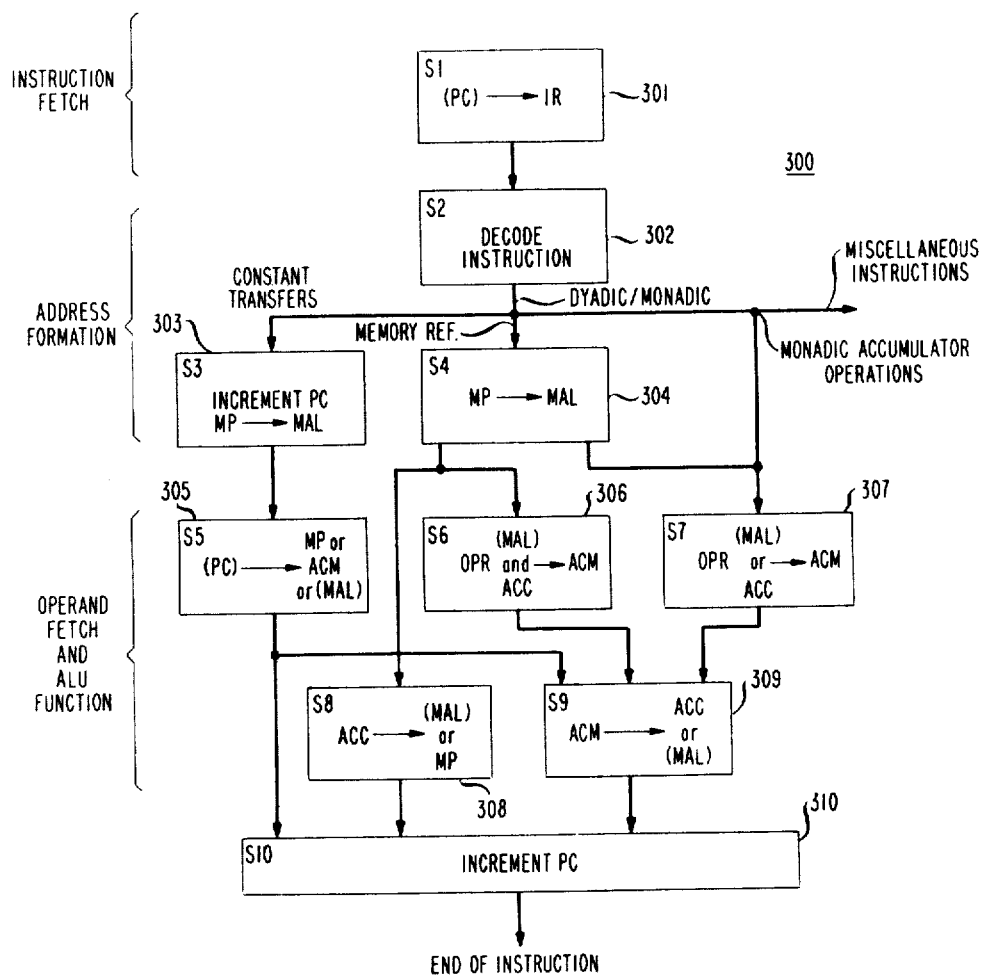
FIG. 3
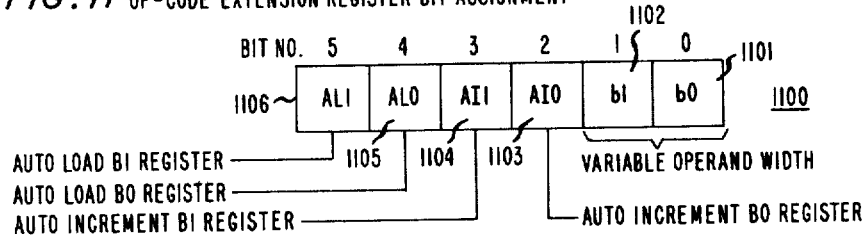
FIG. 11 OP-CODE EXTENSION REGISTER BIT ASSIGNMENT:

DATA PROCESSING APPARATUS PROVIDING AUTOLOADING OF MEMORY POINTER REGISTERS

BACKGROUND OF THE INVENTION

This invention relates to a central processing unit (CPU) for an electronic data processing system and, more particularly to a CPU which provides programmable optional autoloading of memory pointer registers without requiring that the autoloading condition of each memory pointer register be specified by the operation code (op-code) of an instruction.

Autoloading is the process by which certain registers for storing memory location addresses are automatically loaded with an address carried by an instruction. The address which is automatically loaded is normally associated with a memory location containing an operand. Autoloading enables certain registers to be loaded implicitly without requiring separate instructions.

The op-code of an instruction is a group of binary digits (bits) that define a processor operation such as ADD, SUBTRACT, COMPLEMENT, etc. The set of processor operations formulated for a CPU depends on the processing it is intended to carry out. The total number of distinct operations which can be performed by the CPU determines its set of processor operations.

The number of bits which form the op-code (op-code field) is a function of the number of operations in the set. At least N bits are necessary to define $2^N$ or less distinct operations. The CPU designer assigns a different bit combination (i.e., op-code) to each operation. The controller section of the CPU detects the bit combination at the proper time in a sequence and produces proper command signals to required destinations in the CPU to execute the specified operation.

In addition to specifying a processor operation, an instruction will normally also carry other information such as means for determining the address(es) of memory locations where operand(s) to be used in the processor operations are stored. In many instruction formats, the number of bits required for the operand address(es) (address field) occupy most of the bit positions available in the instruction leaving only a limited number of bits to be allocated for the op-code field. When a CPU designer finds the bits allocated to the op-code field insufficient for a given set of processor operations he has, heretofore, had the choice of either accepting a smaller set of processor operations or lengthening the instruction.

Prior art techniques for permitting program control of autoloading have been to use a designated bit in the op-code or the memory address mode code to specify the autoloading condition of each memory pointer register. Where both the op-code and the memory address mode code lengths are insufficient to define new codes, additional bits must be added. For example, if two memory pointer registers are to have the optional autoloading feature, two bits in the op-code would have to be reserved to specify the autoloading condition of the two registers. However, adding bits in the op-code or the memory address mode code has the effect of making the instructions longer.

Long instructions are disadvantageous in small data processing systems where the memory capacity for storing instructions is limited. In addition, small systems have limited word sizes as well (as small as 4 bits) in some systems where the CPU is in the form of a microprocessor), and a long instruction has the added disadvantage of requiring many memory references for retrieval and, thus, of slowing down CPU operation. However, from the standpoint of versatility, programming convenience, and operating efficiency, it is desirable to have optional programmable autoloading. Therefore, a problem in designing a CPU for small data processing systems is that of being able to define optional programmable autoloading while minimizing instruction length.

SUMMARY OF THE INVENTION

The present invention provides a CPU of a data processing system designed for executing a program of stored instructions through a sequence of instruction cycles, the CPU being adapted to be coupled to memory means for storing instructions and data, the memory means having multiple memory locations each associated with a distinct memory location address, the CPU receiving during each instruction cycle an instruction from the memory means, each instruction comprising an op-code part and an address part, the CPU including a memory pointer register for storing an address of a memory location containing data, characterized in that the CPU is adapted to receive from the memory means stored data comprising operand words and op-code extension words, the CPU being further adapted to receive instructions having address parts which comprise an address associated with a memory location containing an operand word, and the CPU further includes an op-code extension register for storing a selected op-code extension word, the op-code extension register having a designated bit position corresponding to the memory pointer register, the contents of the op-code extension register being changed only when the CPU executes an instruction for transferring a newly selected op-code extension word to the op-code extension register, address transfer means responsive to the contents of the designated bit position for transferring before end of an instruction cycle an address contained in an instruction received during the instruction cycle if the designated bit position contains a first binary state.

Thus autoloading of the memory pointer registers can be specified by software without requiring that each instruction corresponding to a processor operation in which autoloading may be used carry information concerning whether or not the autoloading option is enabled. The op-code field in such instructions which need only define the generic operation need not be increased inasmuch as the op-code extension word in the op-code extension register modifies the generic operation according to whether or not autoloading has been selected.

Accordingly, it is an object of the invention to provide a CPU architecture which provides programmable optional autoloading of memory pointer registers without including information concerning autoloading in the op-code of an instruction.

It is another object of this invention to provide a CPU architecture which improves the versatility and performance of a small data processing system having a small word size and limited instruction storage capacity.

It is still a further object of this invention to provide a CPU architecture for reducing the number of memory references required to fetch an instruction in a data processing system having a small word size.

Yet another object of the instant invention is to provide a CPU architecture for low cost, high performance microprocessors.

The above and other objects of the invention are achieved in several illustrative embodiments described hereinafter. However, it should be appreciated that there are possible useful embodiments which are designed to achieve less than all of the preceding objects while still remaining consistent with the principles of the invention. The novel features of the invention, both as to structure and method of operation, together with further objects and advantages thereof will be better understood from the following description considered in connection with the accompanying drawings. It is to be expressly understood, however, that the drawings are solely for the purpose of illustration and description and are not intended to define limits of the invention.

BRIEF DESCRIPTION OF THE DRAWING

FIG. 3 is a state diagram illustrating the sequence of steps followed by the CPU of FIG. 1 in executing an ALU operation.

FIG. 11 depicts the Op-code Extension Register used in the CPU of FIG. 10.

DETAILED DESCRIPTION

Figure 1:
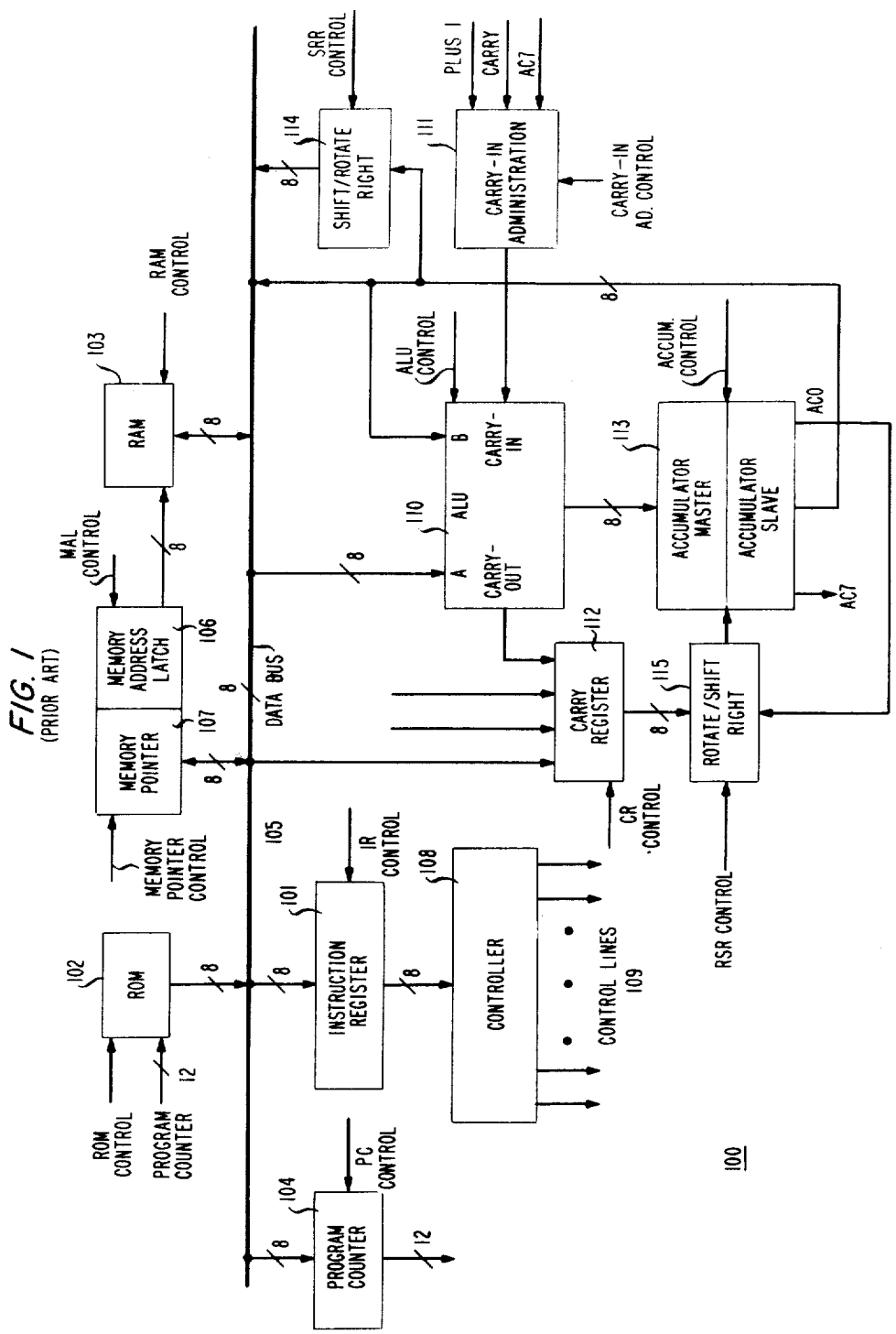
FIG. 1 is a block diagram illustrating a CPU known in the prior art.

Referring now to FIG. 1 there is shown a block diagram representative of a simple CPU, 100, known in the prior art and of a type which is found in small data processing systems such as minicomputers and microprocessor based systems. Only those parts of the CPU which are essential to the explanation to follow have been included in FIG. 1. The configuration of FIG. 1 uses a single Instruction Register (IR), 101, which stores the current instruction being executed. A program of instructions to be executed by the CPU is stored in a Read-Only-Memory (ROM), 102, in the form of binary words hereafter referred to as instruction words. In this example, each instruction word contains eight bits. The CPU retrieves an integral number of instruction words from the ROM to form a complete instruction. Each instruction is composed of an op-code specifying an operation which the CPU is designed to perform and an address code specifying the memory location where an operand or operands to be used for the specified operation are stored. In the CPU of FIG. 1, the operands are stored in a Random Access Read-Write Memory (RAM), 103, also in the form of binary words hereafter referred to as operand words. Although in this example the instructions are stored in a ROM and the operands in a RAM it is also possible to use the ROM for operand storage and the RAM for instruction storage.

In this example, each operand word contains eight bits. An operand is formed with one operand word retrieved from the RAM. The IR holds eight bits of an instruction, six of which are reserved for the op-code, the remaining two being reserved for the part of the address code specifying the addressing mode. Four addressing modes are available in the CPU of FIG. 1, namely the direct mode, two indirect modes, and the immediate data mode. The length of an instruction will vary depending on the addressing mode used. A discussion of these addressing modes which are well known to one skilled in the art of CPU design, can be found in a book entitled *Computer Logic Design* by M. M. Mano, published by Prentice-Hall, Inc., Englewood Cliffs, New Jersey, 1972, on pages 343-350, and U.S. Pat. No. 3,292,151.

As an illustrative example, the 6-bit op-code is used to define 48 processor operations represented by the instruction set listed in Table 1.

TABLE I

| | CPU Instruction Set | |
|---|---|---|
| | Instruction | Op-Code |
| 1 | ADD | 000000 |
| 2 | ADD WITH CARRY | 000001 |
| 3 | SUBTRACT | 000010 |
| 4 | SUBTRACT WITH CARRY | 000011 |
| 5 | AND | 000100 |
| 6 | OR | 000101 |
| 7 | EXCLUSIVE OR | 000110 |
| 8 | MOVE | 000111 |
| 9 | COMPARE AND BRANCH IF EQUAL | 001000 |
| 10 | COMPARE AND BRANCH IF NOT EQUAL | 001001 |
| 11 | COMPARE AND BRANCH IF LESS THAN | 001010 |
| 12 | COMPARE AND BRANCH IF GREATER THAN/EQUAL | 001011 |
| 13 | TEST AND BRANCH IF ZERO | 001100 |
| 14 | TEST AND BRANCH IF NOT ZERO | 001101 |
| 15 | DECREMENT, BRANCH IF NOT ZERO | 001110 |
| 16 | SET | 001111 |
| 17 | CLEAR | 010000 |

TABLE I-continued
CPU Instruction Set

| | Instruction | Op-Code |
|---|---|---|
| 18 | INCREMENT | 010001 |
| 19 | DECREMENT | 010010 |
| 20 | COMPLEMENT | 010011 |
| 21 | ROTATE LEFT | 010100 |
| 22 | ROTATE LEFT WITH CARRY | 010101 |
| 23 | ROTATE RIGHT | 010110 |
| 24 | ROTATE RIGHT WITH CARRY | 010111 |
| 25 | SHIFT LEFT | 011000 |
| 26 | SHIFT LEFT WITH CARRY | 011001 |
| 27 | SHIFT RIGHT | 011010 |
| 28 | SHIFT RIGHT WITH CARRY | 011011 |
| 29 | SET BIT | 011100 |
| 30 | CLEAR BIT | 011101 |
| 31 | BRANCH ON BIT SET | 011110 |
| 32 | BRANCH ON BIT CLEAR | 011111 |
| 33 | EXCHANGE | 100000 |
| 34 | TEST WITH MASK AND BRANCH IF ZERO | 100001 |
| 35 | TEST WITH MASK AND BRANCH IF NOT ZERO | 100010 |
| 36 | BRANCH | 100011 |
| 37 | JUMP | 100100 |
| 38 | CALL | 100101 |
| 39 | RETURN | 100110 |
| 40 | RETURN FROM INTERRUPT | 100111 |
| 41 | CLEAR FLAG REGISTER | 101000 |
| 42 | SET FLAG REGISTER | 101001 |
| 43 | PUSH | 101010 |
| 44 | POP | 101011 |
| 45 | EXCHANGE MEMORY POINTER | 101100 |
| 46 | LOAD STACK POINTER | 101101 |
| 47 | STORE STACK POINTER | 101110 |
| 48 | NO OPERATION | 101111 |

The Program Counter (PC), 104, normally holds the address of the next word of instruction or constant to be retrieved from the ROM. The PC is a 12-bit register which goes through a step-by-step counting sequence pointing to successive instruction words stored in the ROM, except in response to a program transfer instruction (e.g., instructions 9-15, 31, 32, and 34-40 of Table 1) when a new address is loaded into PC. An 8-bit Data Bus, 105, is used for transferring instructions, addresses, and operands between various locations in the CPU. Addresses for accessing locations in the RAM, 103, are stored in the 12-bit Memory Address Latch (MAL), 106, which receives an address from one of a group of registers in the Memory Pointer (MP), 107. The contents of IR are detected by the Controller, 108, which produces command signals for processor operations and address manipulations specified by the detected contents. The command signals are transmitted to various destinations in the CPU via the control lines, 109.

The arithmetic and logical operations are performed in the Arithmetic Logic Unit (ALU), 110, which can receive either one or two operands at its A and B inputs. An Accumulator (ACC), 113, stores an operand for the ALU and also stores the result of the ALU operation. The ALU is provided with a Carry-In input to receive a carry signal and a Carry-Out output where the carry signal generated by the ALU is made available. The input carry signal is provided by the Carry-In Administration circuit, 111, which selects among the Plus 1 signal in the case of an INCREMENT operation, the Carry signal in the case of ROTATE LEFT WITH CARRY operation, or the most significant bit, AC7, of the Accumulator in the case of a ROTATE LEFT operation. The output carry signal is received by the Carry Register (CR), 112, which indicates an ALU function overflow or underflow. The CR is also loadable, resettable, and participates in the SHIFT and the ROTATE operations.

The ACC which has a master section, ACM, and a slave section, ACS, is also used in this example as a latch for data to be read from or written into the RAM. A special Shift/Rotate Right Circuit (SRR), 114, provides for SHIFT AND ROTATE RIGHT operations involving ACC. The SHIFT AND ROTATE LEFT operation is accomplished by adding the operand to itself and, therefore, requires almost no special circuitry. A Rotate/Shift Right Administration Circuit (RSR), 115, is provided to select either the Carry Output signal or the least significant bit, ACO, of ACC to be loaded into the most significant bit position of ACC for the ROTATE RIGHT WITH CARRY and the ROTATE RIGHT operations respectively.

The execution of each instruction by a CPU occurs in a sequence of basic steps which form the instruction cycle. The sequence of steps is governed by timing signals generated by clock circuitry which is not shown in FIG. 1.

Figure 2:
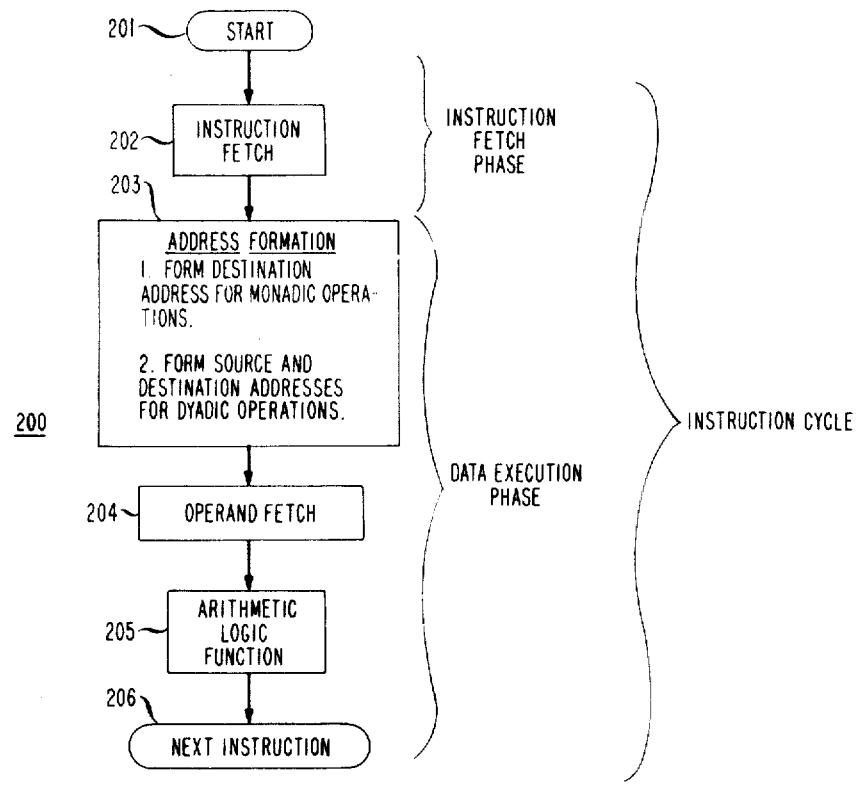
FIG. 2 is a flow chart useful for illustrating the processor sequence during an instruction cycle.

Referring now to FIG. 2 there is shown a flow chart of steps in the instruction cycle. The instruction cycle is divided into two phases: an instruction fetch phase and an execution phase. Reference numerals 201 through 206 indicate the basic stages of each phase. In the instruction fetch phase, an instruction word whose address is in PC is transferred from the ROM to IR. The instruction word as previously mentioned has a 6-bit op-code field and a 2-bit address mode field. The first step in the execution phase where data is involved is the formation of the address or addresses of operands required for the operation. The operands are stored in RAM or in internal registers in the CPU. First, the op-code in IR is decoded by the controller to determine whether the operation is monadic, dyadic or one which does not involve data. A monadic operation is one which requires only one operand and, therefore, only one operand address is formed. The sole operand address formed for a monadic operation is called a destination address because the result of the operation is automatically stored in the memory location previously occupied by the sole operand. A dyadic operation is one which requires two operands and, therefore, two operand addresses are formed. The address of the first operand is called the source address while that of the second operand is called the destination address because the results of the dyadic operation will be automatically stored in the location previously occupied by the second operand. In the CPU of FIG. 1, the destination address is generally ACC.

The address mode bits in IR are also detected by the controller. If direct addressing is indicated, an address is transferred from a location in ROM into MAL. If, however, one of the two indirect addressing modes is indicated, the contents of a specified memory pointer register in MP are transferred to MAL. In the case of the immediate data addressing mode, the operand or operands themselves are carried by the address portion of the instruction and, therefore, no operand addresses are formed.

After the operand address is formed and transferred to MAL, the operand may be fetched from the location in RAM pointed to by MAL. The last step in the execution phase is the performance of the operation specified by the op-code in IR which in this example is an ALU function. Completion of the ALU function terminates the instruction cycle.

Referring now to FIG. 3, a state diagram, 300, for the simplified CPU of FIG. 1 is shown. Reference numerals 301 through 310 indicate the detailed steps in an instruction cycle for executing ALU and data transfer operations. Non-data operations such as BRANCH, CALL, RETURN, etc. are classified as Miscellaneous Instructions and are not shown. The dyadic operation ADD between a first operand stored in a RAM location pointed to by a register in MP and a second operand already stored in ACC can be represented by the state sequence $$S1 \to S2 \to S4 \to S6 \to S9 \to S10.$$

Referring to the states represented by the blocks designated by reference numerals 301 through 310 in FIG. 3, in state S1 the contents of the ROM location addressed by the contents of PC is transferred to IR. In state S2 the contents of IR are decoded by the Controller. Assuming in this example that the addressing mode is indirect, in state S4, 304, the contents of a specified register in MP are transferred into MAL. In state S6, 306, the operand stored in the RAM location specified by the address in the MAL is transferred to the ALU, and a particular ALU operation specified by the op-code (i.e., ADD) is performed on the above operand and the contents of ACC, with the result transferred to the master section (ACM) of ACC. In state S9, 309, the contents of ACM may, as required by the instruction, be transferred either to the slave (ACS) of ACC or to a RAM location pointed to by MAL. For the ADD operation the result (the sum) remains in ACC. In state S10, 310, PC is incremented before the beginning of a new instruction cycle.

An example of a Monadic operation, SET ACCUMULATOR, can be represented by the state sequence $$S1 \to S2 \to S7 \to S9 \to S10.$$

The steps represented by the states S1 and S2 are the same as described above for the dyadic operation. In state S7, 307, the ALU generates an 8-bit word having all "1s" and transfers it into ACM. The steps represented by states S9 and S10 are the same as described above for the dyadic operation.

An example of a data transfer operation, MOVE, of a constant stored in the ROM and carried by the instruction to a register in MP is represented by the state sequence $$S1 \to S2 \to S3 \to S5 \to S10.$$

The steps represented by states S1 and S2 have already been explained in connection wth the dyadic operation. In state S3, 303, PC is incremented to point to the ROM location where the constant is stored. In state S5, 305, the constant in the ROM location pointed to by PC is transferred to MP. The step represented by state S10 has already been explained in connection with the dyadic operation.

The CPU configuration of FIG. 1 can be modified to include processor operations in addition to those listed in Table 1. For example, as will be described in detail, the ALU section can be altered to accommodate 4-bit operands as well as the normal 8-bit operands with the selection of the operand width under program control. Such a modification would affect the arithmetic, logical and data movement operations represented by instructions 1 through 35 in Table 1. The modification would effectively add thirty-five new operations for 4-bit operand width to those listed in Table 1, raising the total number of operations in the set to eighty-three. Inasmuch as the 6-bit op-code field in the CPU of FIG. 1 permits only sixty-four distinct codes, the op-code field must be extended to accommodate the additional operations. Owing to the fact that the word size of the CPU is 8-bits, to avoid interfacing difficulties, it would be necessary to extend the IR by multiples of 8-bits. Therefore, if each instruction were to carry information concerning the operand width, the instruction length would have to increase by at least eight bits. This would cause a considerable increase in ROM space required for storing a program and would also require one more ROM reference to be added to each instruction cycle. The additional memory storage space increases system cost while the additional ROM references slow down system operating speed.

An alternative means for program selection of the operand width is provided by using an op-code extension register. It may be recognized that in most programs, when a particular operand width is selected, many operations may be executed before it becomes necessary to change the operand width. Thus the portion of the op-code field which specifies the operand width remains constant over many instruction cycles while the portion of the op-code field which specifies the operations listed in Table 1 (generic operations) ordinarily changes with each new instruction cycle. Therefore, it would be unnecessary to carry in each instruction the infrequently changing portion of the op-code, which may instead be stored in a special hardware register. For present purposes this special hardware register will be called the op-code extension register (OER). Use of the OER for storing the portion of the op-code which specifies the operand width means that the op-code field in each instruction need only specify the generic operations (e.g., ADD, SUBTRACT, COMPLEMENT, etc.), for which six bits are sufficient. Therefore, by using the OER concept, it becomes unnecessary to increase the instruction length.

In accordance with the above disclosed concept, the OER may also specify other optional features in addition to variable operand width. Some of these other features such as autoloading and autoincrementing of memory pointer registers, and the assignment of address registers, will also be described in detail in this specification.

When there are several optional features to be specified by the OER, there must be a sufficient number of bit positions in the OER to specify all distinct combinations of optional features. A group of bits to be stored by the OER is hereafter referred to as an op-code extension word. The contents of OER are changed only when necessary by means of special instructions (added to the list of Table 1) for transferring to OER a new op-code extension word from memory, and for changing a particular bit in OER. Each op-code extension word corresponds to a distinct combination of special features to be used in the program. Thus, by using the OER concept for program selection of optional features, ROM space is conserved and additional ROM references in each instruction cycle are avoided.

VARIABLE OPERAND WIDTH

Figure 4:
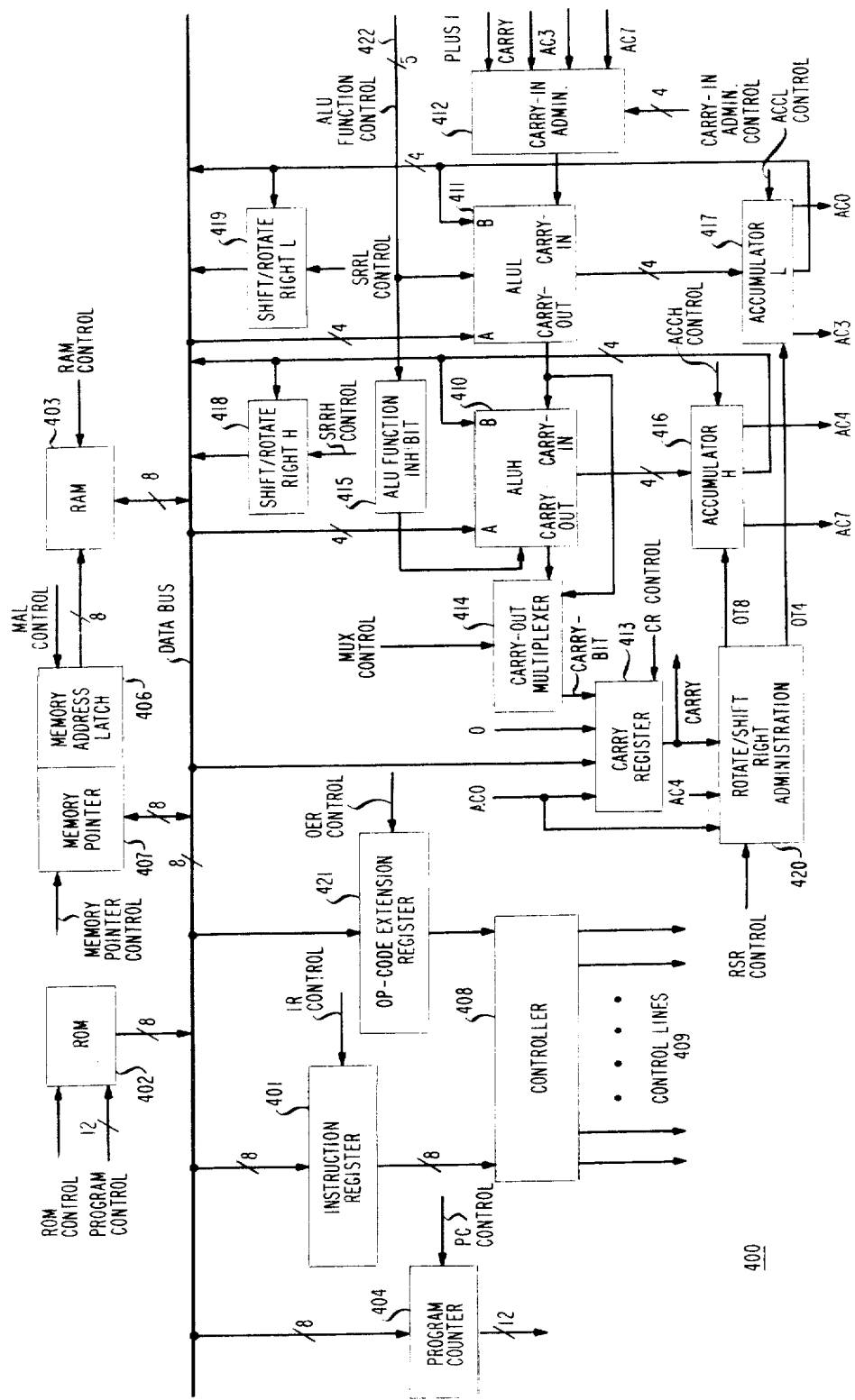
FIG. 4 is a block diagram illustrating a CPU in which the width of operands for ALU operations is placed under program control.

Referring now to FIG. 4, there is shown a block diagram representative of a CPU, 400, basically similar to that of FIG. 1 but with modification to permit changing of the operand width from 8 bits to 4 bits. These modifications include dividing the ALU, the Accumulator, and the Shift and Rotate Right Circuit into two independent 4-bit sections which will be referred to as the "higher" and "lower" sections. In FIG. 4, the "higher" sections of the ALU (ALUH), Accumulator (ACCH), and the Shift and Rotate Right Circuit (SRRH), are indicated by reference numerals 410, 416, and 418 respectively. The "lower" sections of the ALU (ALUL), the Accumulator (ACCL), and the Shift Right and Rotate (SRRL) are indicated by reference numerals 411, 417, and 419, respectively. In each case the "higher" and "lower" sections are connected such that when the operand width is 8-bits, the "higher" section operates on the most significant 4-bits of the operand word while the "lower" section operates on the least significant 4-bits of the 8-bit operand word. When the operand width is 4-bits, the "higher" sections of each divided part are rendered inoperative as if the current instruction were NO OPERATION, while the "lower" sections operate on the least significant 4 bits of an operand word.

Figure 5:
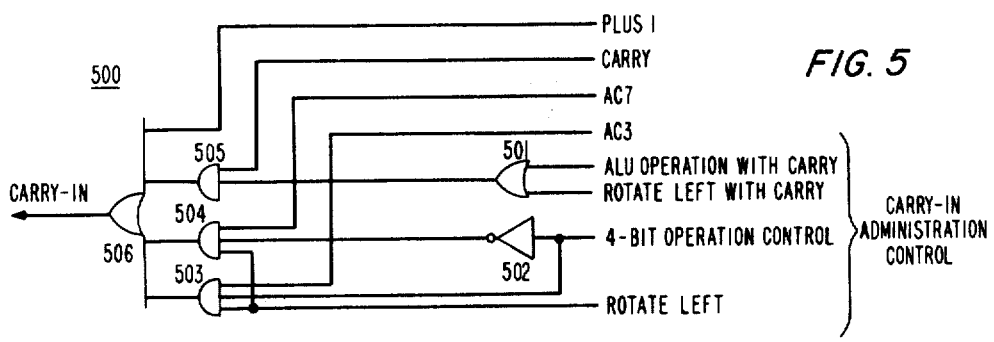
FIG. 5 is a logic diagram of the Carry-In Administration Circuit, used in the CPU of FIG. 4.

The Carry-In Adminstration Circuit (CIA), 412, normally provides a "0" to the Carry-In input of ALUL, 411. When the current instruction is INCREMENT, or DECREMENT, the CIA output is a "1". The CIA output is the state of the Carry Register, 413, when the current instruction is ADD WITH CARRY, SUBTRACT WITH CARRY, or ROTATE LEFT WITH CARRY. For the ROTATE LEFT instruction, the CIA output is the most significant bit (AC7) of ACCH in the case of an 8-bit operand and is the most significant bit (AC3) of ACCL in the case of a 4-bit operand. An example of a logical implementation of the CIA is shown in FIG. 5.

Figure 6:
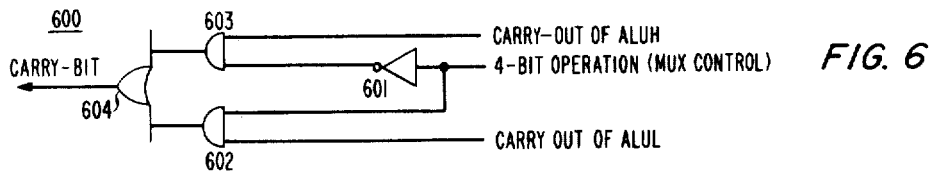
FIG. 6 is a logic diagram of the Carry-out Multiplexer Circuit used in the CPU of FIG. 4.

The Carry-Out Multiplexer Circuit, (COMX), 414, provides the Carry-Bit input to the Carry Register, 413. The COMX output is either the Carry-Out output of ALUH in the case of an 8-bit operand or the Carry-Out output of ALUL in the case of a 4-bit operand. An example of a logical implementation of the Carry-Out Multiplexer is shown in FIG. 6.

The Carry Register (CR), 413, is a flip-flop which can be set from several sources depending upon the current instruction. The operative inputs of CR for various instructions are listed below:

| Instruction | Operative CR Input |
| --- | --- |
| (ALU Operation) WITH CARRY | CB from COMX |
| LOAD CR | Data Bus |
| CLEAR CR | "0" |
| SHIFT RIGHT WITH CARRY | "0" |
| ROTATE RIGHT WITH CARRY | AC0. |

Figure 7:
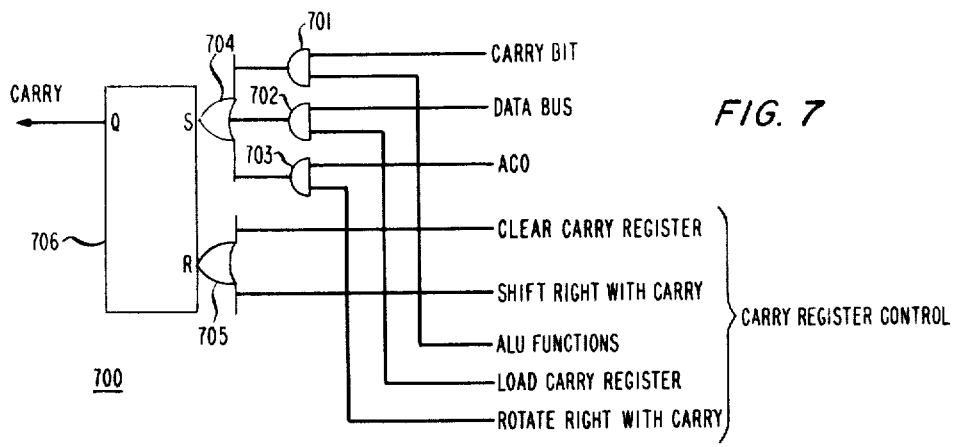
FIG. 7 is a logic diagram of the Carry-Out Register Circuit used in the CPU of FIG. 4.

An example of a logic implementation of the carry register is shown in FIG. 7.

The Rotate/Shift Right Administration Circuit (RSR), 420, provides the most significant bit for ACCH and/or ACCL in SHIFT AND ROTATE RIGHT operations. In the case of 8-bit operand width, RSR provides the state of the least significant bit (AC0) of ACCL to the most significant bit position (AC7) of ACCH via the OT8 output. In addition RSR provides the state of the least significant bit (AC4) of ACCH to the most significant bit position (AC3) of ACCL via the OT4 output. In the case of 4-bit operand width, RSR provides the state of the least significant bit (AC0) of ACCL to the most significant bit position (AC3) of ACCL via the OT4 output. The inputs and operative outputs of RSR for various instructions are listed below:

| Instruction | Inputs | Operative Outputs |
| --- | --- | --- |
| Shift Right (8-bit) | 0,AC4 | OT8,OT4, |
| Shift Right (4-bit) | 0 | OT4 |
| Rotate Right (8-bit) | AC0,AC4 | OT8,OT4 |
| Rotate Right (4-bit) | AC0 | OT4 |
| Right Shift/Rotate With Carry (8-bit) | carry,AC4 | OT8,OT4 |
| Right Shift/Rotate with carry (4-bit) | carry | OT4. |

Figure 8:
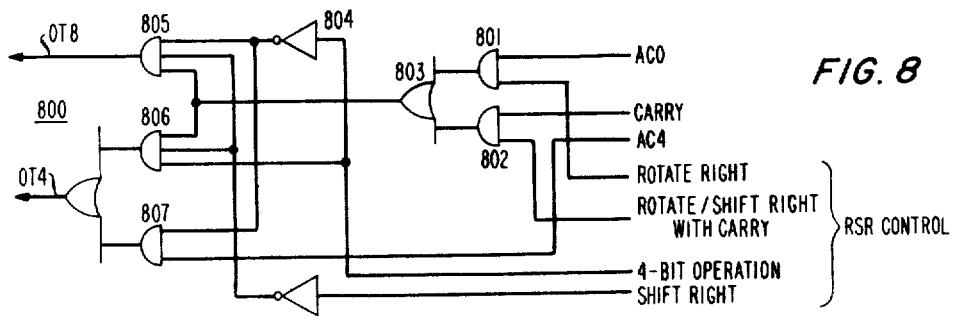
FIG. 8 is a logic diagram of the Rotate/Shift Right Administration Circuit used in the CPU of FIG. 4.

A logical implementation of the Rotate/Shift Right Administrative Circuit is shown in FIG. 8.

Figure 9:
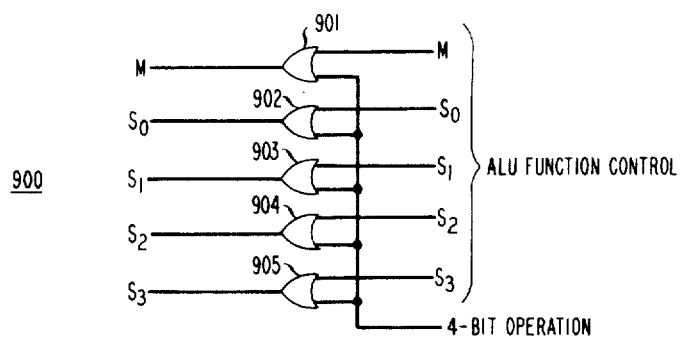
FIG. 9 is a logic diagram of the ALU Function Inhibit Circuit used in the CPU of FIG. 4.

The ALU Function Inhibit Circuit (ALUFI), 415, is used to disable ALUH when the operand width is 4-bits. When the operand width is 8-bits, the ALU function control lines, 422, from the controller, 408, govern the selection of ALU functions for both ALUH and ALUL. However, when the operand width is 4-bits, ALUFI applies a control signal to ALUH which corresponds to the NO OPERATION instruction, and ALUH allows operands to pass through unchanged. An example of a logical implementation of the ALU Function Inhibit Circuit is shown in FIG. 9.

When 4-bit operand width is selected for the CPU of FIG. 4, only the least significant 4-bits of the operand word are operated on while the most significant 4-bits are unused. In order to make use of the most significant 4-bits of the operand word and thereby make full use of the RAM storage space for operands it is necessary to provide means to interchange the most significant and least significant 4-bits of the operand word. Such an interchange can be achieved in several ways.

One way to achieve an effective interchange of the most and least significant 4-bits in an operand word is to interchange under the control of a bit position in the OER, the "higher" and "lower" sections of the ALU. For example, if a designated bit position of the OER for controlling the ALU interchange contains a "0" during 4-bit operation, ALFI would inhibit ALUH while ALUL is allowed to operate on the least significant 4-bits of the operand word. However, if the designated bit position contains a "1" during 4-bit operation, ALFI would inhibit ALUL while ALUH is allowed to operate on only the most significant 4-bits of the operand word.

The most and least significant 4-bits of an operand word can be interchanged directly by introducing a ROTATE 4 instruction to the list in Table 1. The CPU of FIG. 4 upon receiving such an instruction transfers an operand word specified by the instruction from RAM to the divided accumulator where initially the most significant 4-bits of the operand word reside in ACCH and the least significant 4-bits reside in ACLL. The operand word is then rotated in the divided accumulator until the previous most significant 4-bits reside in the ACCL and the previous least significant 4-bits reside in ACCH. The "rotated" operand word in the divided accumulator can either be immediately used in an ALU operation or be transferred back to RAM.

Programmable selection of the operand width is by means of the op-code extension register (OER), 421, which in this example need only contain one bit position. When the binary state of that bit is a "1", the operand width for ALU and data movement operations is 4-bits, otherwise the operand width is 8-bits. A LOAD OER instruction is added to the list in Table 1, and the ROM contains two constants, a "1", and a "0", as op-code extension words. Although only one bit is needed to specify the operand width, OER may contain additional bit positions for selecting other optional features as discussed above.

The above-described CPU configuration for implementing variable operand width under program control by using an OER and a divided ALU is specifically claimed in a copending application Ser. No. 974,426 filed concurrently with the instant application.

Figure 10:
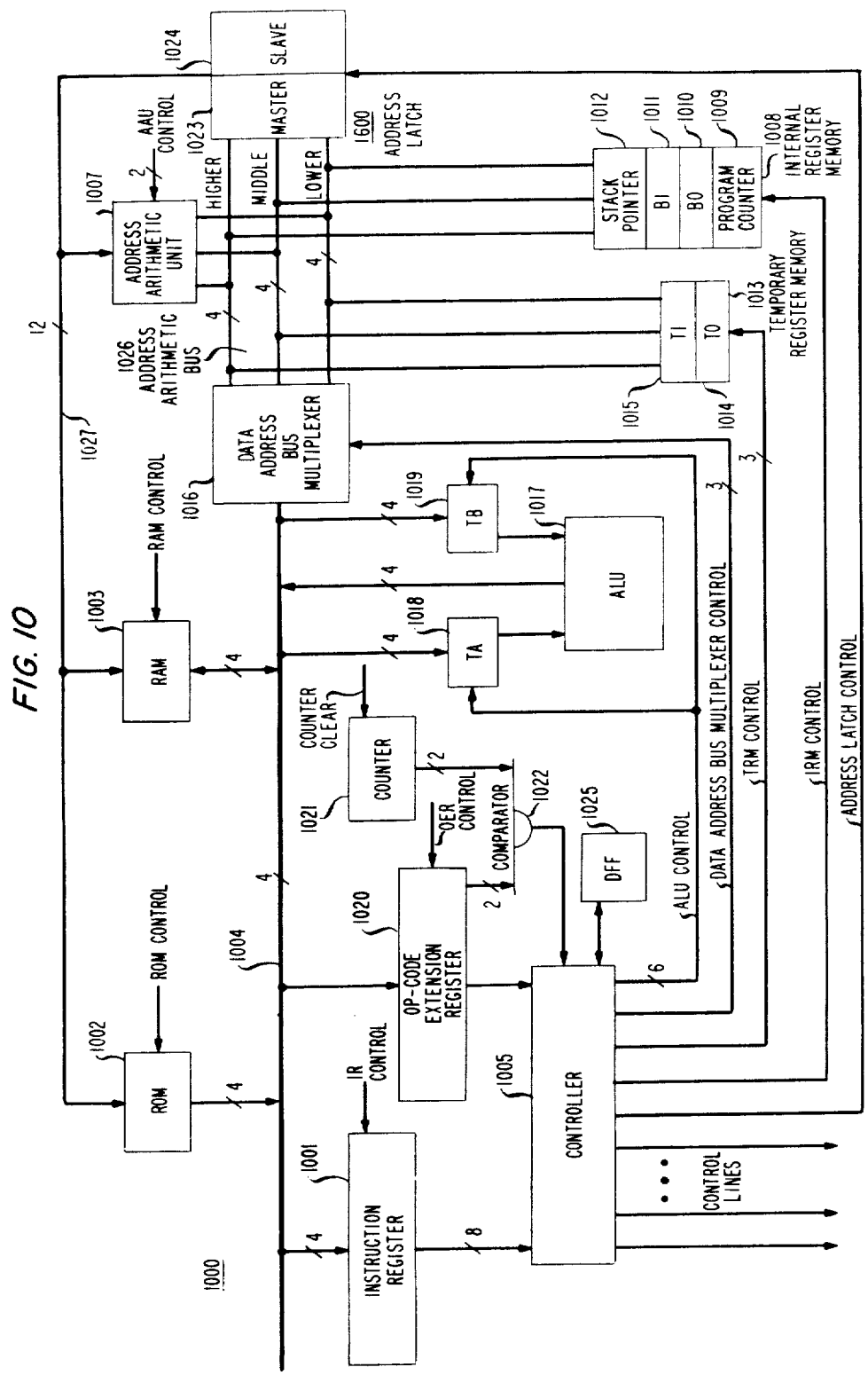
FIG. 10 is a block diagram illustrating a CPU in which the optional features of variable operand width, autoloading and autoincrementing of memory pointer registers are placed under program control in accordance with the present invention.

An alternative CPU configuration for implementing variable operand width as well as other optional features is shown in FIG. 10. Although the CPU architecture of FIG. 10 is basically different from that of FIG. 4, the same op-code extension register concept is used to select the optional features. Referring now to FIG. 10, the Instruction Register, 1001, the ROM, 1002, the RAM, 1003, the Data Bus, 1004, and the Controller, 1005, all serve the same function as their corresponding parts in the CPU of FIG. 4 except the word size of the ROM and RAM, and the widths of the Data Bus and the Instruction Register are all 4-bits instead of 8-bits. The Address Latch (AL), 1006, is a 12-bit master-slave latch for storing the current address of an intruction or of an operand. The 12-bit address arithmetic unit (AAU), 1007, increments or decrements the current address in AL. The Internal Register Memory (IRM), 1008, is a group of registers which include a Program Counter (PC), 1009, two Memory Pointer Registers B0, 1010, and B1, 1011, and a Stack Pointer, 1012. The Temporary Register Memory (TRM), 1013, contains two temporary registers T0, 1014, and T1, 1015, used for intermediate address calculations during the address formation stage. The four address modes available in the CPU of FIG. 4 are also available in the CPU of FIG. 10.

The Data-Address Bus Multiplexer (DAMUX), 1016, controls the transfer of data in 4-bit words from ROM and RAM to the 12-bit registers in IRM and TRM via the 4-bit Data Bus. The DAMUX multiplexes the 4-bits from the Data Bus onto one of three 4-bit sections (designated higher, middle and lower sections) of the Address Arithmetic Bus, 1026. The three sections of the Address Arithmetic Bus are coupled respectively to the higher, middle, and lower 4-bit sections of the 12-bit registers in IRM and TRM. A 12-bit address bus, 1027 transfers addresses from the AL to the AAU, RAM, and ROM.

The 4-bit Arithmetic and Logic Unit (ALU) is used to perform all arithmetic and logical functions. The operands for the ALU are stored in 4-bit temporary data registers TA, 1018, and TB, 1019.

Unlike the CPU of FIG. 4, the CPU of FIG. 10 does not have an addressable accumulator. Instead, the RAM locations pointed to by the Memory Pointer Registers, 1010 and 1011, are allowed to be used as accumulators. This permits the CPU to have as many accumulators as RAM space permits.

The basic operand width of the ALU in the CPU of FIG. 10 is 4-bits; however, its configuration is such that ALU operations can be performed on operands whose widths are integral multiples of the basic width (specifically, 4, 8, 12, and 16-bits). For operands having widths which are multiples of the basic width, the ALU operates on 4-bit segments of the operand beginning with the least significant segment and repeating the ALU operation on the other segments according to their order of significance. A 4-bit segment is commonly referred to as a nibble. The number of repetitions of an ALU operation required for a given operand width is equal to the number of nibbles in the operand.

In the example of FIG. 10, OER has 6 bit positions which are assigned according to FIG. 11. Referring to FIG. 11 a 2-bit field comprising bits b0, 1101, and b1, 1102, specify the four optional operand widths of 4 bits, 8 bits, 12 bits, and 16 bits. The other 4 bit positions of OER are used to specify other special features to be described later in this specification. The coding of bits b0 and b1 and the number of repetitions needed to complete an ALU operation for each state are listed below:

| b1, b0 | operand width | ALU repetitions |
| --- | --- | --- |
| 00 | 16-bits | 4 |
| 01 | 4-bits | 1 |
| 10 | 8-bits | 2 |
| 11 | 12-bits | 3 |

Referring again to FIG. 10, the number of repetitions of an ALU operation specified by the contents of OER is controlled by the 2-bit Counter, 1021, and the Comparator, 1022, which compares the state of the counter with that of b0–b1. When the state of the counter and that of b0–b1 match, repetition of the ALU operation ceases.

Figure 12:
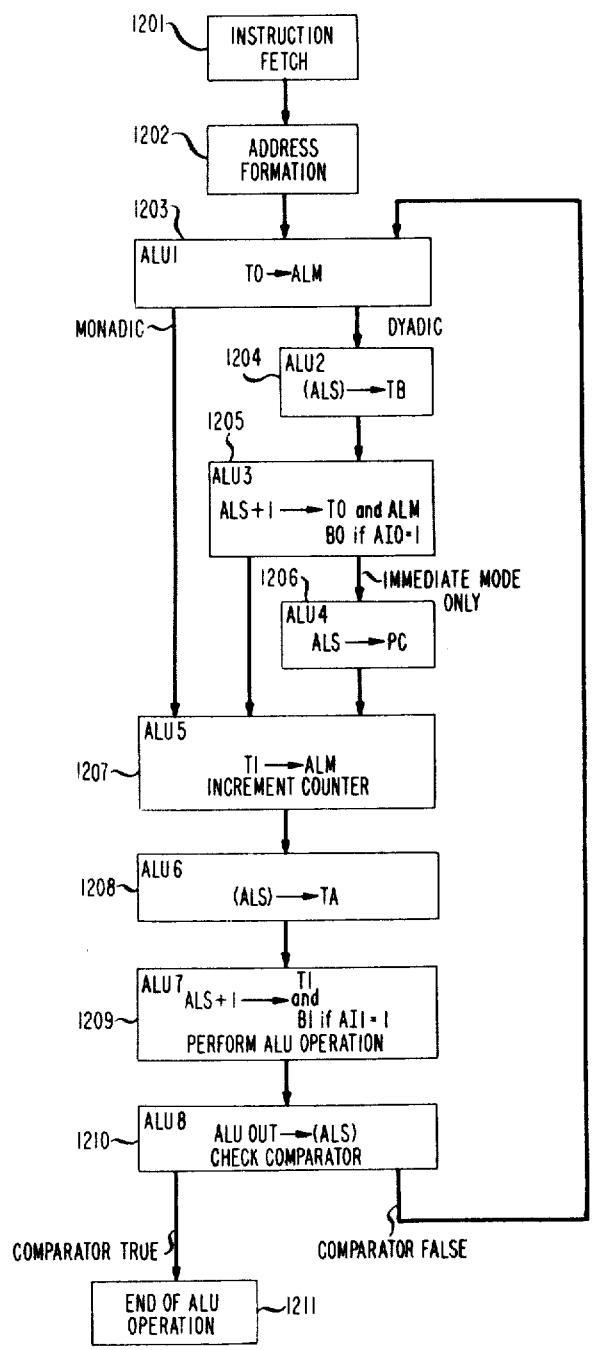
FIG. 12 is a state diagram illustrating the sequence of steps followed by the CPU of FIG. 10 in executing an ALU operation and the operation of the variable operand width and autoincrementing features.

The details of an ALU operation in the CPU of FIG. 10 can be better understood when considered with the State Diagram, 1200, shown in FIG. 12. Referring to FIG. 12, the Instruction Fetch States, 1201, and the Address Formation States, 1202, have already been discussed in connection with FIG. 2. After address formation, the source address for a dyadic operation is stored in temporary register T0. When the operation specified by the current instruction as either monadic or dyadic, the destination address is in temporary register T1. It is to be noted that in the CPU of FIG. 10 a destination address is always required for a dyadic operation, unlike the CPU of FIG. 4 where the accumulator is generally the implied destination for dyadic operations.

In state ALU1, 1203, the contents of T0 (source address) are transferred to the master (ALM) of the Address Latch (1023 in FIG. 10). If the current instruction specifies a monadic operation, the next state is ALU5, 1207; otherwise the next state is ALU2, 1204. During the transition from ALU1 to ALU2, the contents of ALM are transferred to the slave (ALS) of the Address Latch (1024 in FIG. 10), and in state ALU2 the operand stored in the RAM location pointed to by ALS is transferred to temporary data register TB. In state ALU3, 1205, the address in ALS is incremented and transferred to both T0 and ALM, and if another optional feature, autoincrementing, yet to be described, is enabled, the incremented address is also transferred to pointer register B0. If the current instruction specifies immediate data addressing for the second operand of the dyadic operation (i.e., the second operand itself is carried in the address field of the current instruction) the next state is ALU4, 1206. In ALU4 the contents of ALS are transferred to PC, restoring the ROM address for the next data constant or instruction. For the other addressing modes, the next state is ALU5, 1207, where the destination address stored in T1 is transferred to ALM an the 2-bit Counter is incremented, the Counter having been cleared at the beginning of the instruction cycle. During the transition from state ALU5 to state ALU6 the contents of ALM are transferred to ALS. In state ALU6, 1208, the contents of the RAM location pointed to by ALS are transferred to temporary data register TA. The next state is ALU7, 1209, where ALS is incremented and its contents tranferred to T1 and to B1 if the autoincrementing feature is enabled. The ALU operation specified by the current instruction is performed on two operands provided by TA and TB in the case of a dyadic operation or on a single operand provided by TA in the case of a monadic operation. The next state is ALU8, 1210, where the result of the ALU operation (ALU OUT) is stored in the RAM location pointed to by ALS. The state of the Counter is then compared with the state of b0–b1 in OER. If the Comparator output is true, the ALU operation is completed; but if the Comparator output is false, the CPU returns to state ALU1 and the ALU operation is repeated.

The above described CPU configuration for implementing variable operand width under program control using an OER and an ALU designed to operate repetitively on one nibble of the operand at a time is specifically claimed in copending application Ser. No. 974,425 filed concurrently with the instant application.

AUTOLOADING OF POINTER REGISTERS

Another optional feature of the CPU in FIG. 10 which can be selected under program control using the OER is autoloading of the pointer registers B0 and B1. This feature is only available for the direct addressing mode where the full operand address is carried in the address code of the instruction. When autoloading is enabled, the operand addresses supplied by the current instruction are automatically stored in specified pointer registers at the completion of the instruction cycle. Autoloading of B0 and B1 is controlled by the state of bit positions AL0 (1105 of FIG. 11) and AL1 (1106 of FIG. 11) in OER respectively, a "1" state enabling the autoloading feature.

Figure 13:
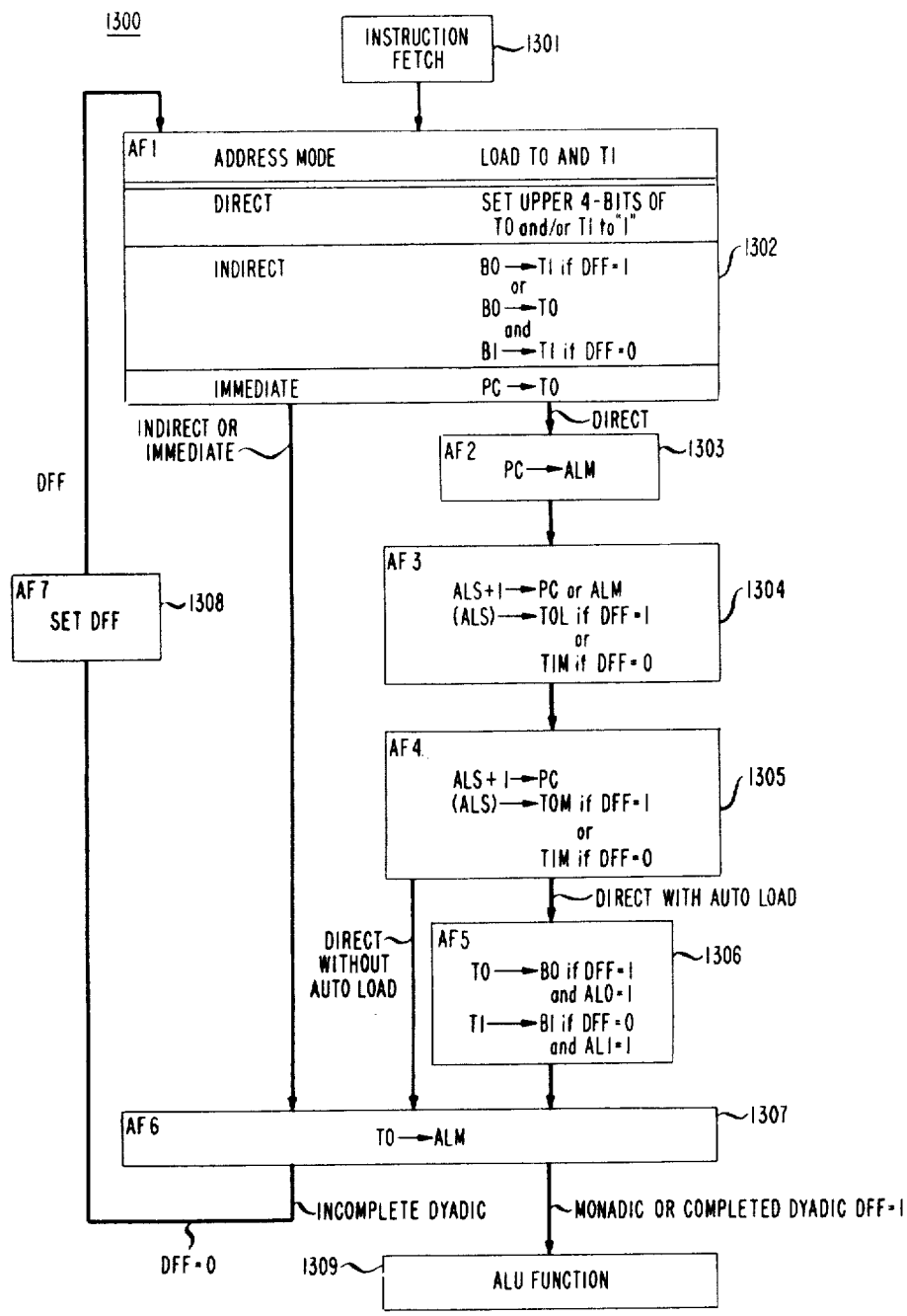
FIG. 13 is a state diagram illustrating the sequence of steps followed by the CPU of FIG. 10 in address formation and the operation of the autoloading feature.

Autoloading is performed during the address formation stage of the execution phase. A state diagram of the address formation stage for the CPU of FIG. 10 is shown in FIG. 13. An example of address formation is now explained with reference to FIG. 13.

During the instruction fetch phase represented by the block with reference numeral 1301, an instruction word containing an op-code and an address mode code is transferred from ROM to IR. The CPU then goes to the first address formation state AF1, 1302. The path followed by the CPU through the address formation steps depends on the addressing mode specified by the address mode code in IR and on whether the operation specified by the op-code in IR is monadic or dyadic. A D-type flip-flop (DFF), 1025, in the CPU of FIG. 10 keeps track of whether the address being formed for a dyadic operation is a source or destination address. Prior to the formation of the source address of a dyadic operation, DFF is clear (DFF=0), but prior to the formation of the sole operand address of a monadic operation or the destination address of a dyadic operation, DFF is set (DFF=1). If the direct addressing mode is specified for the source address, the most significant (upper) 4-bits of T0, are set to all "1s", and, similarly, if the direct addressing mode is specified for the destination address, the most significant 4-bits of T1 are set to all "1s".

The CPU then proceeds to state AF2, 1303. If the specified addressing mode is for indirect addressing, the contents of B0 are transferred to T1 if DFF is set, or the contents of B0 are transferred to T0 and the contents of B1 are transferred to T1 if DFF is clear. The CPU then proceeds directly to state AF6, 1307. If the specified addressing mode is for immediate data, the state of PC is transferred to T0 and the CPU proceeds directly to state AF6.

In state AF2, for the case of direct addressing, the contents of PC are transferred to ALM, the contents of PC being the address of the ROM location containing the first nibble of the operand address. During the transition from state AF2 to state AF3, 1304, the contents of ALM are transferred to ALS. In state AF3, ALS is incremented and its contents transferred to PC. If another nibble from ROM is required to complete the formation of the address the incremented address is ALS is also loaded into ALM. The contents of the ROM location pointed to by ALS are then transferred to the lower four bits of T0 (T0L) if DFF is set, or to the lower four bits of T1 (T1L) if DFF is clear. During the transition from state AF3 to state AF4, 1305, the contents of ALM are transferred to ALS. In state AF4, ALS is again incremented and its contents transferred to PC. The contents of the ROM location pointed to by ALS are transferred to the middle four bits of T0 (T0M) if DFF is set, or to the middle four bits of T1 (T1M) if DFF is clear. It is to be noted that the upper 4 bits of an operand address in the direct addressing mode is "1111".

If the autoloading feature is not enabled for either B0 or B1, then the CPU proceeds from state AF4 directly to state AF6. Otherwise, the next state is AF5, 1306. In state AF5 the contents of T0 are loaded into B0 if DFF is set and autoloading is enabled for B0 (i.e., AL0=1), or the contents of T1 are loaded into B1 if DFF is clear and autoloading is enabled for B1 (i.e., AL1=1).

In state AF6, the completed operand address in T0 is transferred to ALM. If DFF is set in state AF6, address formation is completed and the CPU proceeds to the ALU function represented by the block with reference numeral 1309. If, however, DFF is clear indicating that address formation for a dyadic operation is incomplete, the CPU proceeds first to state AF7 where DFF is set and then to state AF1 and repetition of the address formation steps for the destination address.

AUTOINCREMENTING OF POINTER REGISTERS

Another optional feature of the CPU of FIG. 10 which can be enabled or disabled by means of the OER is the autoincrementing of the Pointer Registers B0 and B1. When this feature is enabled for a specified Memory Pointer Register, the address stored in that register will be automatically advanced (incremented) at the end of each instruction cycle to point to the memory location of the first nibble of the next operand in the case where the operands are stored in consecutive memory locations. Autoincrementing of B0 and B1 is controlled by the state of the OER bit positions AI0 (1103 of FIG. 11) and AI1 (1104 of FIG. 11), respectively. A "1" state enables the autoincrementing feature.

When enabled, autoincrementing of B0 and B1 take place during the ALU function state of the data execution phase as represented by the state diagram of FIG. 12. Referring now to FIG. 12, as explained above in connection with the variable operand width feature, when the CPU is in state ALU3, 1205, a source address stored in ALS pointing to a nibble of a first operand (assuming a dyadic operation) is incremented to point to the next nibble of the same operand, if the ALU operation is to be repeated on the next nibble. If the ALU operation has been completed on all nibbles of the same operand, ALS points to the first nibble of a new first operand. The incremented address is then transferred to T0 and ALM. If autoincrementing of B0 has been enabled, (i.e., AI0=1), the incremented address is also transferred from ALS to B0. In state ALU7, 1209, a destination address contained in ALS pointing to a nibble of the second operand of the dyadic operation, is incremented and transferred to T1. If autoincrementing of B1 has been enabled (i.e., AI1=1), the incremented address is also transferred from ALS to B1. The ALU operation is then performed on the corresponding nibbles of the first and second operands residing respectively in TA and TB. The result of the ALU operation is stored in the memory location previously occupied by the corresponding nibble of the second operand. The ALU operation is repeated, if required, on additional nibbles of the first and second operands. It is to be noted that with autoincrementing enabled for a particular pointer register its contents are incremented with each repetition of the ALU operation such that at the end of the instruction cycle the pointer register is always pointing to the first nibble of the next operand.

The above described CPU configuration for implementing autoincrementing of memory pointer registers under program control using an OER is specifically claimed in a copending application Ser. No. 974,361 filed concurrently with the instant application.

We claim:

1. A CPU of a data processing system designed for executing a program of instructions through a sequence of instruction cycles, the instructions being stored in memory means having multiple addressable locations including locations for storing data, the CPU including:
   (a) means for coupling to the memory means for storing instructions and data, the instructions comprising a first kind having an address portion which includes an address of a memory location containing data, and a second kind having an address portion which refers to a memory pointer register for an address of a memory location containing data, the data comprising operands and op-code extension words;
   (b) means for retrieving an instruction from the memory means in each instruction cycle;
   (c) means responsive to the retrieved instruction for retrieving from memory means data specified by the address portion of the instruction;
   (d) a memory pointer register for storing an address of a memory location containing data for reference by an instruction of the second kind;
   (e) an op-code extension register for storing an op-code extension word and having a designated bit position associated with the memory pointer register;
   (f) means responsive to a special instruction for transferring to the op-code extension register an op-code extension word specified by the special instruction, the contents of the op-code extension register being altered only when the CPU executes a special instruction;
   (g) means responsive to the address portion of a retrieved instruction and to the designated bit position in the op-code extension register for transferring to the memory pointer register during an instruction cycle the address included in a retrieved instruction of the first kind if the designated bit position contains a first logic state.

2. A CPU of a data processing system designed for executing a program of instructions through a sequence of instruction cycles, the instructions being stored in memory means having multiple addressable locations including locations for storing data, the CPU including:
   (a) means for coupling to memory means for storing instructions and data, the instructions comprising a first kind having an address portion which contains a first and/or a second address of memory locations containing data, and a second kind having an address portion which refers to memory pointer registers for addresses of memory locations containing data, the data comprising operands and op-code extension words;
   (b) means for retrieving an instruction from the memory means in each instruction cycle;
   (c) means responsive to the retrieved instruction for retrieving from the memory means data specified by the instruction;
   (d) first and second memory pointer registers for respectively storing a first and a second address of memory locations containing data for reference by an instruction of the second kind;
   (e) an op-code extension register for storing an op-code extension word and having a first and a second bit position associated with the first and the second memory pointer registers, respectively;
   (f) means responsive to a special instruction for transferring to the op-code extension register an op-code extension word specified by the special instruction, the contents of the op-code extension register being altered only when the CPU executes an instruction for loading the op-code extension register; and (g) means responsive to the address portion of a retrieved instruction and to the first and the second bit positions in the op-code extension register for transferring to the first memory pointer register during an instruction cycle the first address contained in a retrieved instruction of the first kind if the first address is present and if the first bit position contains a first logic state and for transferring to the second memory pointer register during the instruction cycle the second address contained in the retrieved instruction of the first kind if the second address is present and if the second bit position contains the first logic state.

3. A CPU as recited in claim 2 wherein the memory means comprise a ROM and a RAM and wherein the CPU and at least a part of the ROM and the RAM are fabricated on a single integrated circuit chip.

* * * * *